US008495504B2

(12) United States Patent
Brugler et al.

(10) Patent No.: US 8,495,504 B2
(45) Date of Patent: Jul. 23, 2013

(54) CUSTOMIZABLE BRANCH NAVIGATIONAL AREA CONTROL

(75) Inventors: Thomas S. Brugler, Fuquay-Varina, NC (US); Vincent C. Conzola, Raleigh, NC (US); Randall A. Craig, Raleigh, NC (US); Todd M. Eischeid, Cary, NC (US); Mark E. Molander, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 12/770,113

(22) Filed: Apr. 29, 2010

(65) Prior Publication Data

US 2011/0271234 A1    Nov. 3, 2011

(51) Int. Cl.
*G06F 3/048* (2006.01)
(52) U.S. Cl.
USPC ........... 715/754; 715/828; 715/825; 715/829; 715/841; 715/853; 715/767; 715/772; 715/788; 715/798; 715/815
(58) Field of Classification Search
USPC ................. 715/854, 815, 828, 825, 829, 841, 715/853, 855, 722, 767, 788, 798
See application file for complete search history.

(56) References Cited

U.S. PATENT DOCUMENTS

| 5,515,487 | A | 5/1996 | Beaudet et al. |
| 6,025,843 | A * | 2/2000 | Sklar .............................. 715/841 |
| 6,380,957 | B1 * | 4/2002 | Banning ....................... 715/828 |
| 2005/0198582 | A1 * | 9/2005 | Hennum et al. .............. 715/772 |
| 2005/0278633 | A1 * | 12/2005 | Kemp ........................... 715/713 |
| 2006/0129569 | A1 | 6/2006 | Dieberger et al. |
| 2007/0198930 | A1 | 8/2007 | Chu et al. |

* cited by examiner

*Primary Examiner* — Alvin Tan
*Assistant Examiner* — Rinna Yi
(74) *Attorney, Agent, or Firm* — Kenneth L. Sherman, Esq.; Michael Zarrabian, Esq.; Sherman & Zarrabian LLP

(57) ABSTRACT

The invention provides customizable branch navigational area control. Navigational area branches are displayed on a device. Expansion of the navigational area branches is controlled. Selection is accepted for particular navigational area branches. The selected particular navigational area branches are prevented from collapsing upon exceeding a predetermined maximum number limit, by collapsing other navigational area branches to maintain the predetermined maximum number limit. The predetermined maximum number limit represents a limit of navigational area branches allowed to remain in an expanded state.

20 Claims, 9 Drawing Sheets

CUSTOMIZABLE BRANCH NAVIGATIONAL AREA CONTROL

BACKGROUND OF THE INVENTION

1. Field of the Invention

The present invention relates generally to branched navigational display areas and in particular to customizable branch navigational area control.

2. Background Information

Navigation display areas include branches and sub-branches that are expandable with a toggle control that is known as a "twistie." The branches and sub-branches of the navigation display area are each independently expandable without limitation. With the expansion of many branches and/or sub-branches simultaneously, a navigation display area becomes overwhelming for users as many of the branches remain open over time.

Other known navigation display areas limit branch and sub-branch expansion to a single branch or sub-branch at any one time. This causes the inconvenience of closing an expanded branch that may be desired to still be viewed upon the expansion of another branch or sub-branch.

BRIEF SUMMARY OF THE INVENTION

Embodiments of the invention provide customizable branch navigational area control. One embodiment comprises a system including a memory configured for storing navigation area branch information. The system further includes a user interface configured for accepting customizable selections for: displaying navigational area branches by using the navigation area branch information. The user interface is further configured for controlling expansion of navigational area branches. The user interface is still further configured for selecting particular navigational area branches, and preventing the selected particular navigational area branches from collapsing upon exceeding a predetermined maximum number limit. The predetermined maximum number limit represents a limit of navigational area branches allowed to remain in an expanded state.

In another embodiment of the invention, a method comprises displaying navigational area branches on a device. The method further includes controlling expansion of the navigational area branches. Selection is accepted for particular navigational area branches. The selected particular navigational area branches are prevented from collapsing upon exceeding a predetermined maximum number limit. The predetermined maximum number limit represents a limit of navigational area branches allowed to remain in an expanded state.

In yet another embodiment of the invention, a computer program product for customizing navigational area branch control comprising a computer usable medium including a computer readable program, wherein the computer readable program when executed on a computer causes the computer to display navigational area branches on a device. The computer is further caused to control expansion of the navigational area branches. The computer is still further caused to receive selection for particular navigational area branches. The particular navigational branches are prevented from collapsing upon exceeding a predetermined maximum number limit. The predetermined maximum limit represents a limit of navigational area branches allowed to remain in an expanded state.

Other aspects and advantages of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification, as well as meanings understood by those skilled in the art and/or as defined in dictionaries, treatises, etc. The description may disclose several preferred embodiments for customizable navigation area display and control, as well as operation and/or component parts thereof. While the following description will be described in terms of customizing navigational area branch control systems and processes for clarity and placing the invention in context, it should be kept in mind that the teachings herein may have broad application to all types of systems, devices and applications.

Embodiments of the invention allow customization of navigational area branch expansion and collapse control. With these embodiments of the invention, a particular limited number of branches are selectable to remain open at any one time, and particular branches can be selected to remain open when the limit is reached and another branch is selected for expansion. Additionally, prevention of scrolling out of a display of particular navigational area branches is selectable. The embodiments improve the user friendliness of navigational area displays, save time and simplify retrieving information as desired by individual users of the navigational area.

One embodiment of the invention provides customizable branch navigational area control. One implementation comprises a system including a memory configured for storing navigation area branch information. The system further includes a user interface configured for accepting customizable selections for: displaying navigational area branches by using the navigation area branch information. The user interface is further configured for controlling expansion of navigational area branches. The user interface is still further configured for selecting particular navigational area branches, and preventing the selected particular navigational area branches from collapsing upon exceeding a predetermined maximum number limit. The predetermined maximum number limit represents a limit of navigational area branches allowed to remain in an expanded state.

Figure 1:
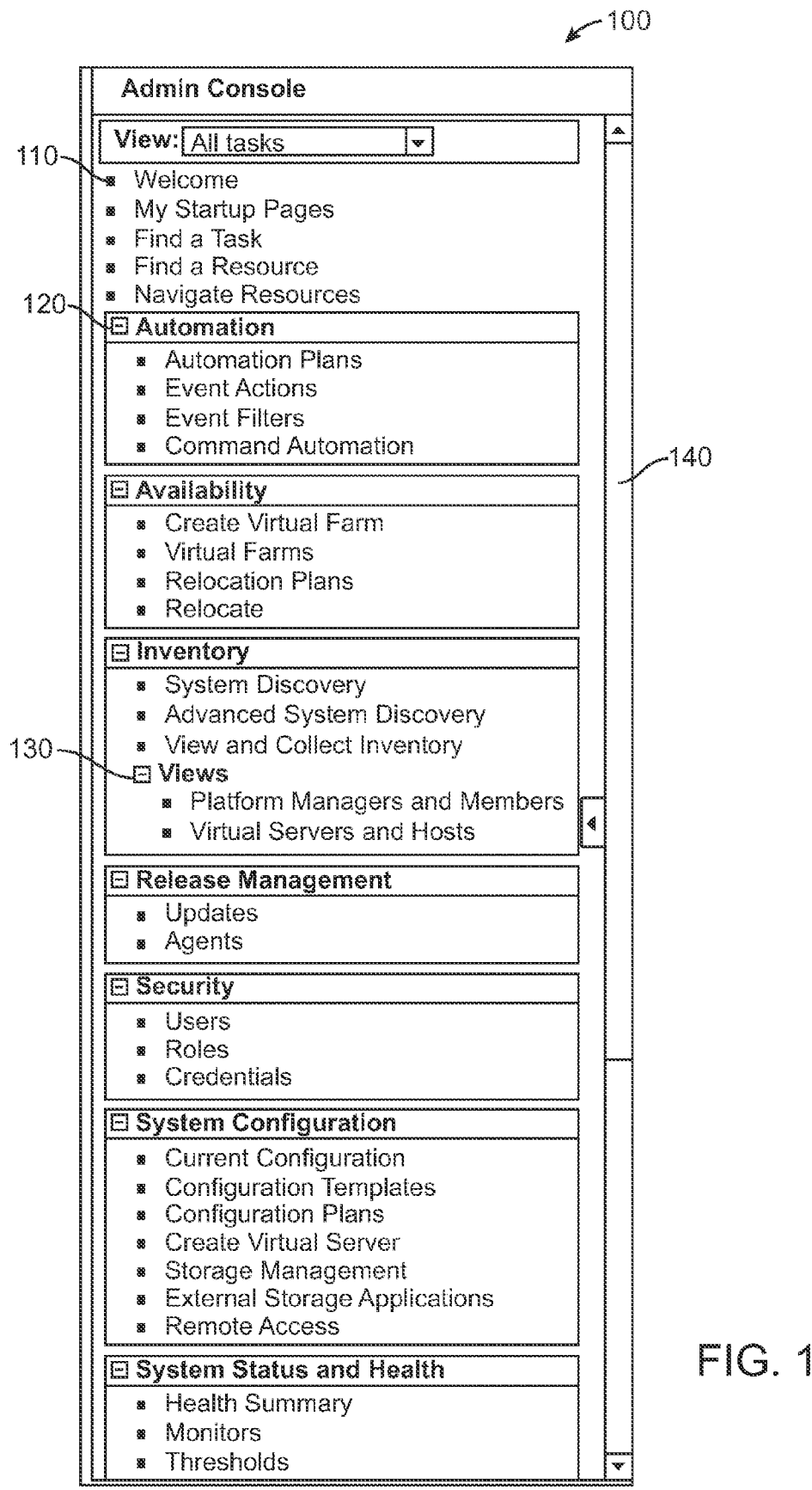
FIG. 1 illustrates a typical navigation display area.
Figure 2:
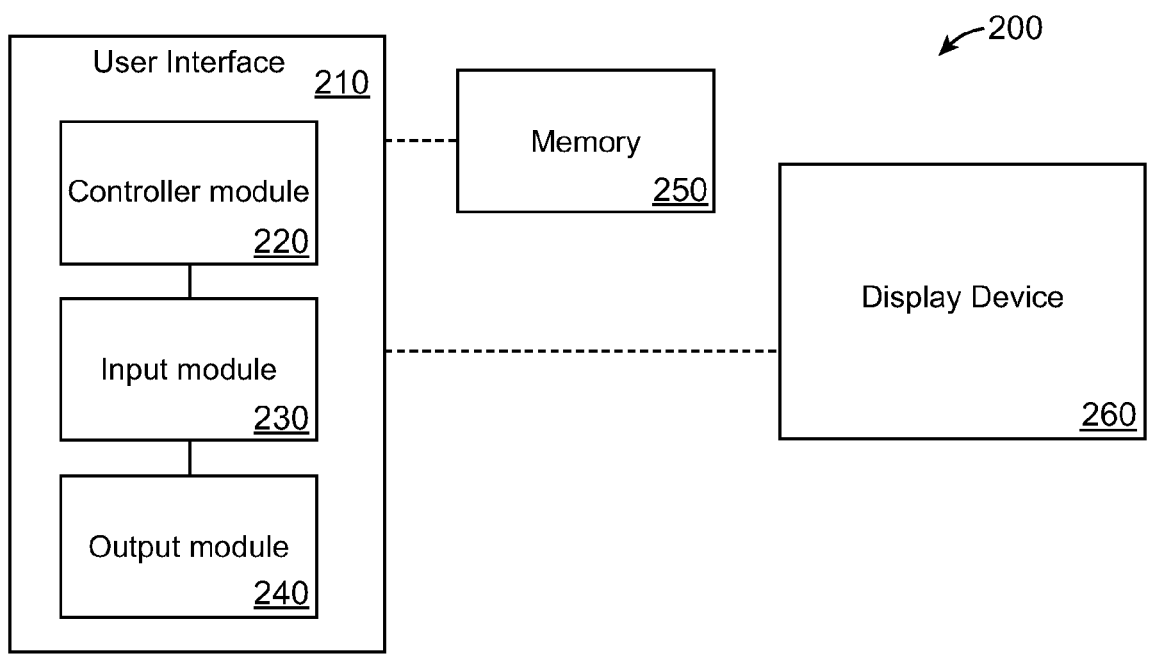
FIG. 2 illustrates a customizable navigation area system according to one embodiment of the invention.

FIG. 1 shows an example of a navigation display area 100 that includes nodes without a toggle control 110, nodes with toggle controls 120 that are each associated with a particular title of a branch (e.g., Automation) or sub-branch (e.g., sub-branch Views 130), and a scroll bar 140. As illustrated in FIG. 1, all of the nodes (i.e., node 120 and sub-branch 130) that can be expanded are shown in an expanded state only for illustration purposes. FIG. 2 illustrates an implementation of a customizable navigation area control system 200, according to one embodiment of the invention. The customizable navigation area control system 200 includes a user interface 210, a memory 250 and a display device 260. In one example, the user interface 210 comprises a controller module 220, an input module 230 and an output module 240. In one embodiment of the invention, the user interface 210 can be a computing device, such as a workstation, a portable wireless computer device (e.g., notebook, laptop, tablet, palm, pad), etc., a wireless communication device, such as a cell phone, smart phone, a personal digital assistant (PDA), etc. In this embodiment of the invention, the user interface 210 is coupled to the display device 260 for displaying a navigation area, such as an administrator console for a computing system or network. The display device 260 can comprise any display device either directly connected to the user interface 210, wireless connected to the user interface 210, etc.

In one embodiment of the invention, navigation area information is stored in the memory 250. In one example, the memory 250 comprises a memory device, such as one or more random access memory (RAM), read-only memory (ROM), erasable programmable read-only memory (EPROM or Flash memory), encoded signal, metadata, machine-readable memories including: semiconductor firmware memory, programmable memory, non-volatile memory, etc., magnetic disk memory, and/or optical disk memory, memory device arrays, virtual memory space using a memory device, etc.

In one example, the memory 250 can be a removable memory device or a permanently coupled memory device. In another example, the navigation area information includes content that is arranged in a hierarchical tree containing nodes, branch nodes, sub-branch nodes, etc. In one example the content includes, text, graphics, video, audio, etc., types of content.

In another embodiment of the invention, navigation area information is retrieved from a network, such as a Wireless Local Area Network (WLAN). For example, the navigation area information can include content such as text, graphics, video, audio, or links to such content. In one example, the navigation area information pertains to system administrative tasks in a data center, such as maintenance information, repair information, troubleshooting information, shutdown/startup procedures, backup procedures, etc. It should be noted that the navigation area information can pertain to many different technologies or subject matter, such as food preparation, repair information, how to information, general knowledge, sports information, etc.

In another example the network is the Internet. In these embodiments of the invention, the user interface 210 receives the navigation area information through known wireless technologies, such as cellular technologies, such as digital mobile communication (e.g., 2G), wideband (e.g., 3G), broadband (e.g., 4G), etc., WI-FI (e.g., IEEE 802.11 technology), etc.

In one embodiment of the invention, the input module 230 accepts input from a user through devices, such as a keyboard, resistive digitizer (e.g., touch screen), mouse, digital pen, microphone/speaker(s), etc. The controller module 220 receives the input from the input module 230, processes the input, and communicates output information to the output module 240. The output module 240 communicates new navigational area display information to the display device 260.

In one embodiment of the invention, the user interface 210 accepts user input to customize control of the navigation area displayed on the display device 260. In one example, the user interface 210 limits a number of navigation branches/sub-branches that may be expanded to a predetermined (i.e., default value) number for example, two (2), three (3) or four (4). In another example, the limit for the number of navigation branches/sub-branches that may remain in an expanded state is customizable by a user through the user interface 210. In this example, upon the limit being reached for the maximum number of navigation branches allowed to be expanded, other previously expanded navigation branches are collapsed. For example, a user may require three branches to be open at one time based on user preference, while the default limit only allows one or two branches to remain open at any one time. In this case, the user customizes the limit of navigation branches/sub-branches that can be expanded at any one time to three by using the user interface 210.

Figure 3:
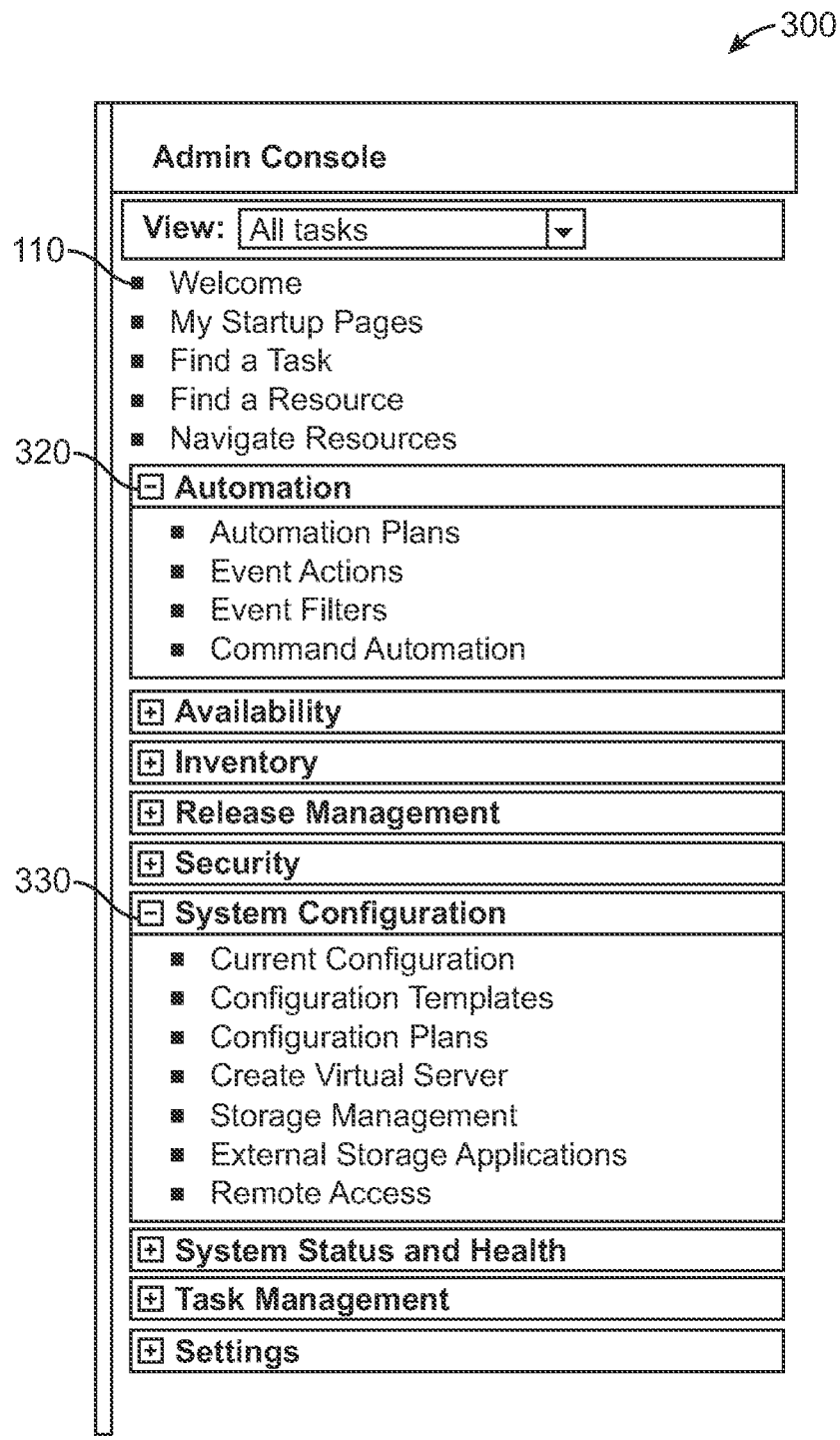
FIG. 3 illustrates an example of a customized navigational area according to one embodiment of the invention.

FIG. 3 illustrates an example of a navigation area 300 that is selected to be limited to two (2) branches (e.g., navigation node 320 and navigation node 330) and/or sub-branches that can remain in an expanded state at any one time, according to one embodiment of the invention. In one example, upon another navigation branch selected for expansion by a user through the user interface 210, either navigation node 320 or navigation node 330 will collapse. In one embodiment of the invention, controller module 220 determines which previously expanded navigation branch will collapse once the limit is reached based on time. In this example, the oldest expanded branch will be collapsed upon the limit being reached for the maximum number of allowed expanded navigation branches. In one example, a time tag is implemented and a comparison between the already expanded navigation branches is made by the controller module 220 to determine which of the previously opened navigation branches will be collapsed.

In another example, the controller module 220 determines the previously expanded navigation branches to collapse based on the relation between the previously expanded branches and the newly selected branch to be expanded. In one example, the least related previously expanded branch is collapsed to maintain the limit of allowed expanded branches. In one example, the relationship between the branches is based on the distance between the nodes of the previously expanded navigation branches and the navigation branch selected for expansion. In one example, the previously expanded navigation branch that is farthest away from the navigation branch about to be expanded is collapsed. In one example, a number/value is assigned to the branches in the navigation area. Sub-branches of a branch are closer than related branches in a node, such as navigation node 320 and navigation node 330. In one example, in case of a tie, the oldest navigation branch between the two previously expanded branches is collapsed.

In another embodiment of the invention, the relation between the previously expanded navigation branches and the navigation branch selected for expansion is determined based on related content. In one example, a comparison of keywords is made by the controller module 220. If the controller module 220 determines that there are matching keywords between one of the previously expanded navigation branch and the navigation branch selected for expansion, and no keywords match between another previously expanded navigation branch and the navigation branch selected for expansion, then the navigation branch with no matching keywords is collapsed. In one example, the keywords are predetermined by administration personnel. In another example, the keywords are determined by frequency of matching text content (e.g., words, phrases, titles, etc.). In this example, the text content of the branch information of the previously expanded navigation branches are compared to the text content of the navigation branch selected for expansion by the controller module 220. The controller module 220 determines the least number of matching text content between the expanded navigation branches and the navigation branch selected for expansion will be collapsed.

In another embodiment of the invention, the controller module 220 uses heuristics to determine which previously expanded navigation branch to collapse once the limit is reached for expanded navigation branches with a selection of a new navigation branch for expansion. In one example, the history of user selection is maintained. The controller module 220 determines based on the history, which of the previously expanded navigation branches has the highest probability of being expanded with other navigation branches. The previously expanded navigation branches that have the least probability of being expanded in the past with the navigation branch selected for expansion is collapsed.

Figure 4:
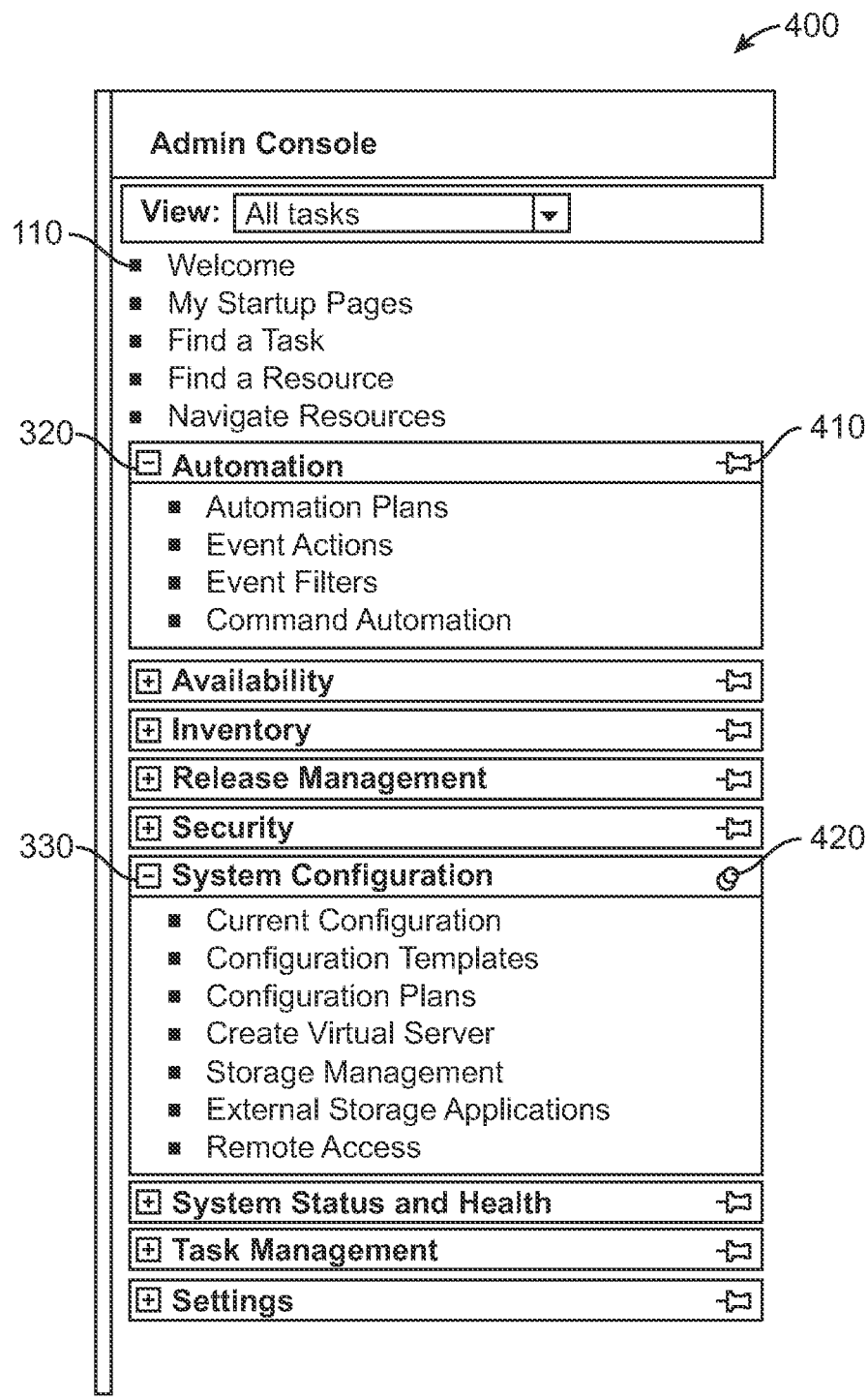
FIG. 4 illustrates another example of a customized navigational area according to one embodiment of the invention.

FIG. 4 illustrates an example of a navigation area 400 that is selected to be limited to two (2) branches (e.g., navigation node 320 and navigation node 330) and/or sub-branches that can remain in an expanded state at any one time, where a particular branch(es) are selectable for remaining expanded upon the limit being reached with another branch or sub-branch selected for expansion, according to one embodiment of the invention. In one example, an icon 410 of a pin, tack, etc., is selectable to give a navigation branch priority over previously expanded navigation branches that are being compared by the controller module 220 to determine which navigation branch to collapse. In one example, navigation end/leaf nodes do not have the icon 410 and cannot be selected to remain in an expanded state over navigation branches with a selected icon 410. In one example, once the icon 410 is selected for the associated navigation branch, the icon 410 changes form to a selected icon 420 to show that the associated navigation branch (e.g., navigation branch 330) has been selected to remain in an expanded state once the limit for the maximum number of expanded navigation branches has been reached and another navigation branch is selected for expansion. In one example, the selected icon 420 is shown as a pin, thumb tack, etc. that has changed form (e.g., pushed in, etc.). It should be noted that other symbols, shapes, types, colors, etc. for icons 410 and selected icons 420 can be implemented by other embodiments of the invention.

Figure 5:
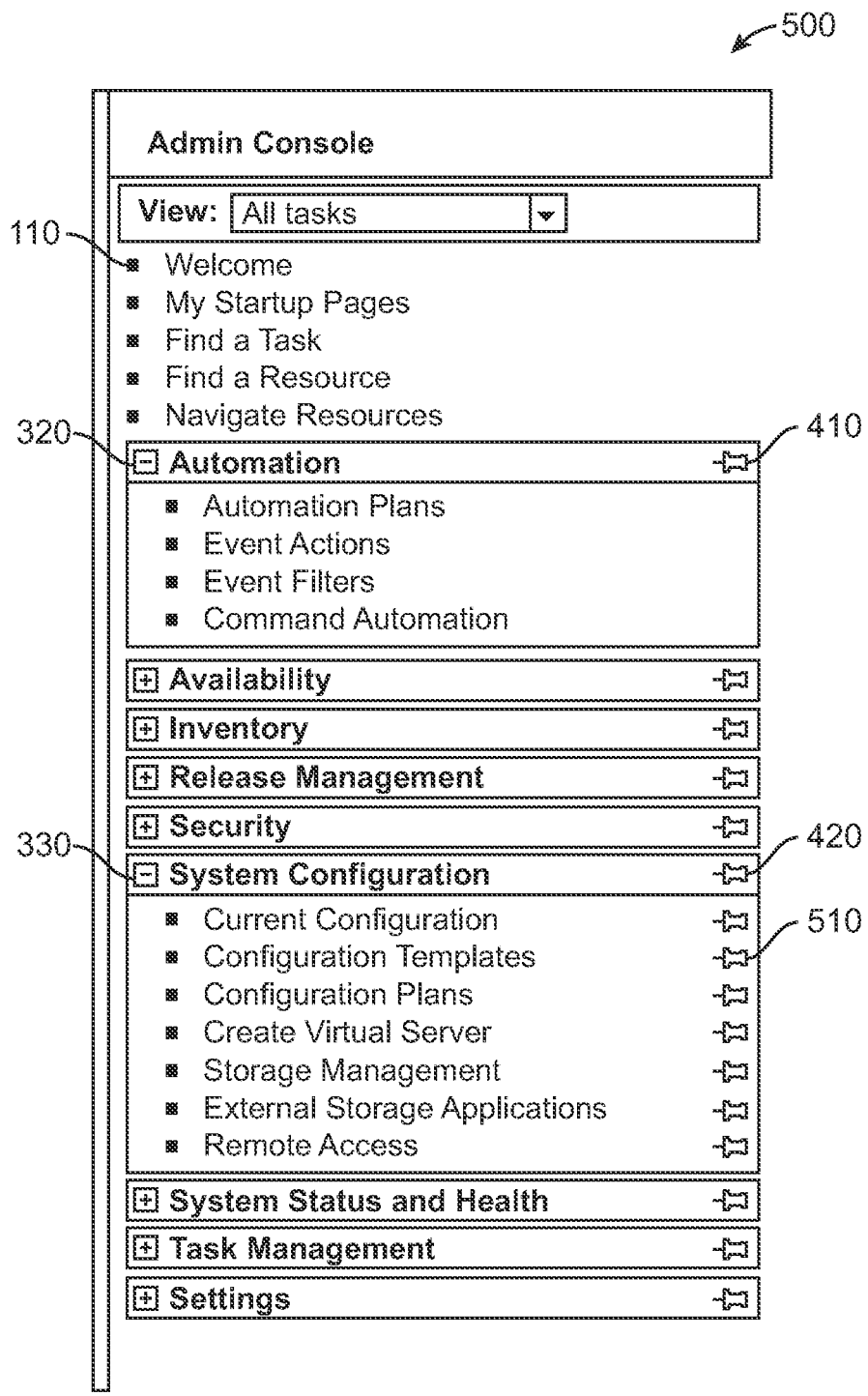
FIG. 5 illustrates yet another example of a customized navigational area according to one embodiment of the invention.

FIG. 5 illustrates an example of a navigation area 500 that is selected to be limited to two (2) branches (e.g., navigation node 320 and navigation node 330), sub-branches and/or end nodes that can remain in an expanded state at any one time, where a particular branch(es), sub-branch(es) and end nodes are selectable for remaining expanded or open upon the limit being reached with another navigation branch, sub-branch or end node selected for expansion, according to one embodiment of the invention. In one example, an icon 510 of a pin, tack, etc. is selectable to give a navigation end node priority over previously expanded navigation branches, sub-branches and end nodes that are being compared by the controller module 220 to determine which navigation branch, sub-branch or end node to collapse.

Figure 6:
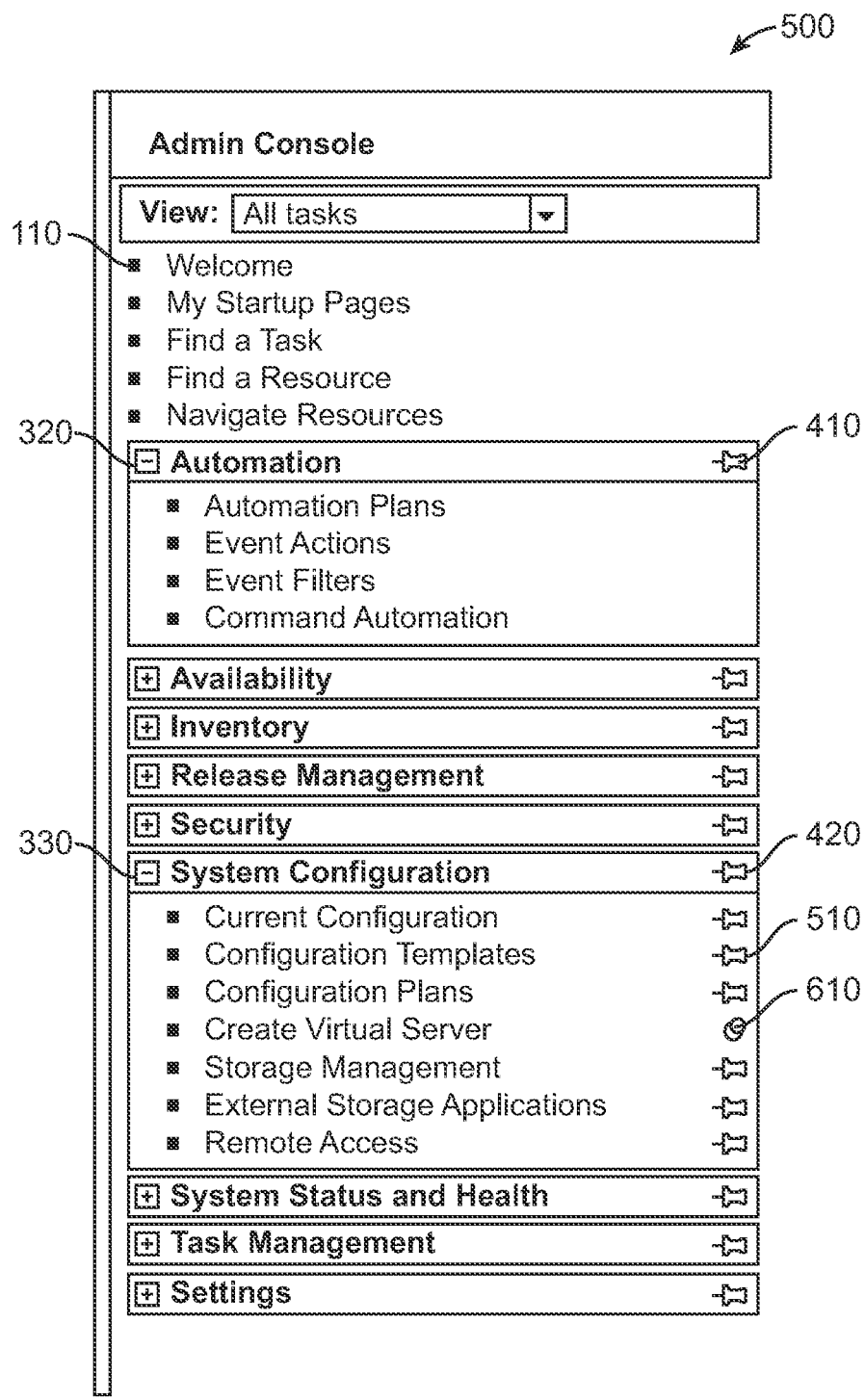
FIG. 6 illustrates an example of a customized navigational area according to one embodiment of the invention.

FIG. 6 illustrates an example where, once the icon 510 is selected for the associated navigation sub-branch, the icon 510 changes form to a selected icon 610 to show that the associated navigation end node (e.g., end node "Create Virtual Server") has been selected to remain in an expanded state once the limit for the maximum number of expanded navigation branches, sub-branches and end nodes has been reached and another navigation branch, sub-branch or end node is selected for expansion. In one example, the selected icon 610 is shown as a pin, thumb tack, etc. that has changed form (e.g., pushed in, etc.). It should be noted that other symbols, shapes, types, colors, etc. for selected icons 610 can be implemented by other embodiments of the invention.

Figure 7:
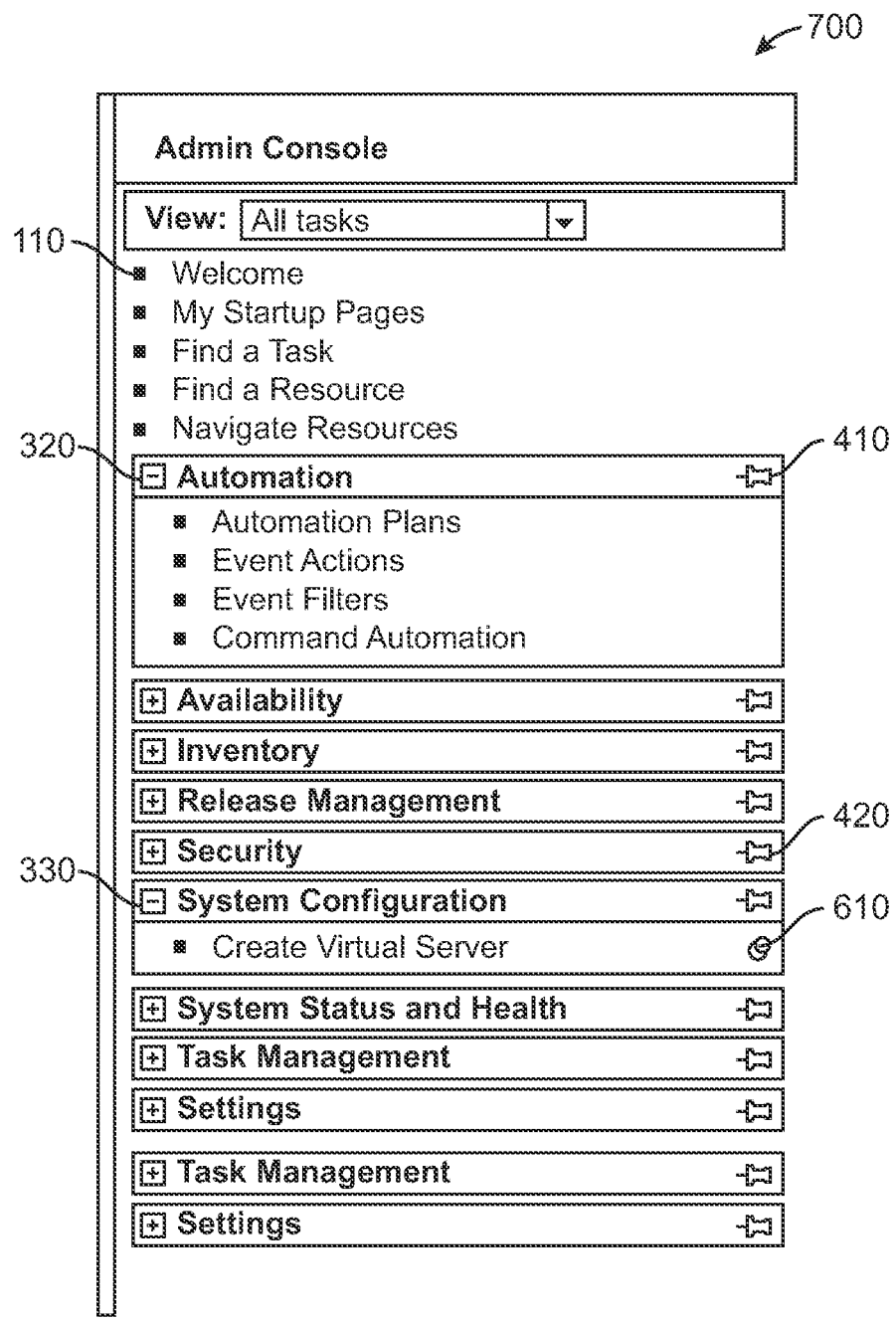
FIG. 7 illustrates still another example of a customized navigational area according to one embodiment of the invention.

FIG. 7 illustrates a navigation area 700 that is selected to be limited to two (2) branches (e.g., navigation node 320 and navigation node 330), sub-branches and end nodes that can remain in an expanded state at any one time, where a particular branch(es), sub-branches and end nodes are selectable for remaining expanded upon the limit being reached with another navigation branch, sub-branch or end node selected for expansion, according to one embodiment of the invention. As illustrated in this example, selected icon 610 associated with the "Create Virtual Server" end node remains open and the navigation node 330 is collapsed so that the maximum number of expanded navigation branches, sub-branches and end nodes is limited to two (2).

Figure 8:
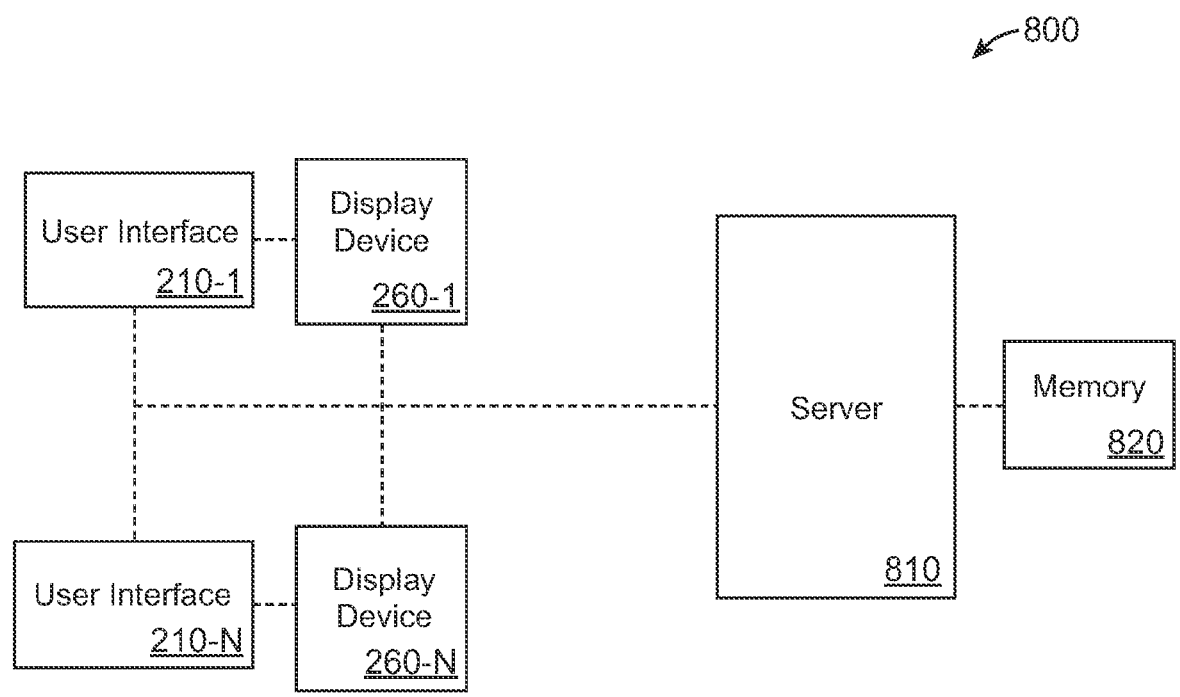
FIG. 8 illustrates a distributed system according to an embodiment of the invention.

FIG. 8 shows a block diagram of example architecture of an embodiment of a distributed customizable navigation area control system 800. In this embodiment of the invention, the distributed customizable navigation area control system 800 includes user interfaces 210-1 through 210-N, display devices 260-1 through 260-N, that may be distributed, in any combination in a network of any of the following: a LAN, WLAN, Internet, local network, home network, private network, etc., or any combination of network types, and connect to a server 810. In this embodiment of the invention, the server 810 is coupled to a memory 820. In one example, the user interfaces 210-1 through 210-N perform similar functions as with the customizable navigation area control system 200 and other described embodiments of the invention. In one example, the server 810 performs the similar functions as with the customizable navigation area control system 200. In this example, the user interfaces 210-1 through 210-N do not include a controller module 220.

In another example, the memory 820 comprises a memory device, such as one or more RAM, ROM, EPROM or Flash memory, encoded signal, metadata, machine-readable memories including: semiconductor firmware memory, programmable memory, non-volatile memory, etc., magnetic disk memory, optical disk memory, memory device arrays, virtual memory space using a memory device, etc. In one example, the memory 820 can be a removable memory device or a permanently coupled memory device.

In one embodiment of the invention where the distributed customizable navigation area control system 800 uses the Internet, the network represents a worldwide collection of networks and gateways that use the Transmission Control Protocol/Internet Protocol (TCP/IP) suite of protocols to communicate with one another. Included as central to the Internet is a backbone of high-speed data communication lines between major nodes or host computers, comprising a multitude (e.g., thousands, tens of thousands, etc.) of commercial, governmental, educational and other computer systems that route data and messages.

Figure 9:
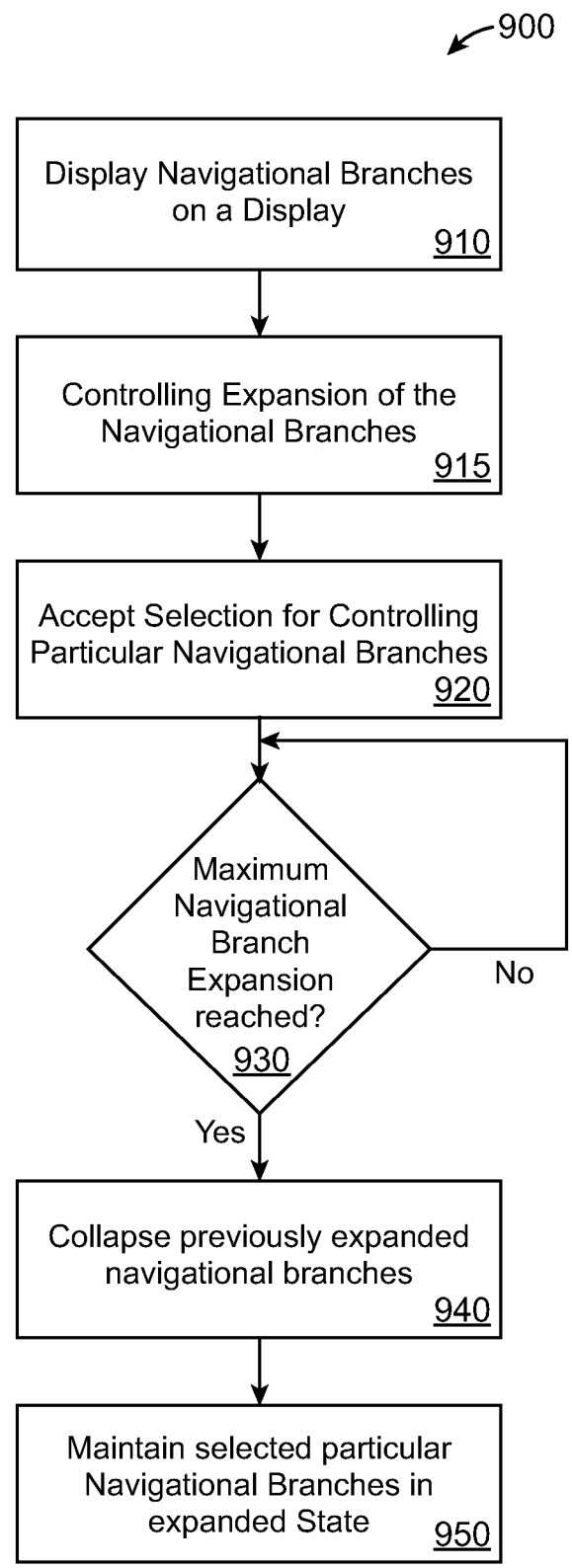
FIG. 9 illustrates a block diagram of a process according to an embodiment of the invention.

FIG. 9 illustrates a block diagram of an example process 900 for customizable navigation area control, according to an embodiment of the invention. In one or more embodiments of the invention, the details of the process 900 are similar in functionality with respect to one or more embodiments of the customizable navigation area control system 200 and the distributed customizable navigation area control system 800, in particular to the functionality of the user interface 210 in conjunction with memory 250 and display device 260 for the customizable navigation area control system 200, and the user interfaces 210-1 through 210-N, display devices 260-1 through 260-N, server 810 and memory 820 of the distributed customizable navigation area control system 800.

According to the process 900, block 910 displays navigational branches for a navigational area on a display device (e.g., display device 260, display device 260-1 through 260-N). Block 915 controls expansion of navigational branches (e.g., navigational branches, sub-branches and end nodes) according to one embodiment of the invention. In one example, the expansion is controlled with a predetermined limited number of expanded navigation branches, sub-branches and end nodes, or limited based on user selection.

In block 920 a selection is accepted for controlling a particular navigational branch, sub-branch or end node. In block 930 it is determined whether the maximum limit of expanded navigation branches, sub-branches and end nodes is reached. If it is determined that the maximum branch expansion limit has been reached, the process 900 continues with block 940. Otherwise, process 900 continues with block 930.

In block 940 previously expanded navigational branches, sub-branches and end nodes are collapsed based on a customized user selection for controlling the navigation area display. In block 950, the selected particular navigational branches, sub-branches or end nodes are maintained in an expanded state.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc. Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart illustrated in FIG. 8 and block diagrams in FIGS. 2 and 7 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

I/O devices (including but not limited to keyboards, displays, pointing devices, resistive digitizers (i.e., touch screens), etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters. In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system comprising:
    a memory configured for storing navigation area branch information; and
    a user interface configured for accepting customizable selections for:
        displaying navigational area branches by using the navigation area branch information;
        controlling expansion of the navigational area branches;
        selecting particular navigational area branches; and
        preventing the selected particular navigational area branches from collapsing upon exceeding a predetermined maximum number limit, by collapsing other navigational area branches to maintain the predetermined maximum number limit, wherein the predetermined maximum number limit representing a selectable number limit of the navigational area branches allowed to remain in an expanded state,
    wherein a particular selected navigational area branch prevented from collapsing that remains expanded is a leaf-node of a previously expanded navigational area branch that collapses upon exceeding the predetermined maximum number limit for the navigational area branches allowed to remain in the expanded state, and
    wherein the customizable selections for controlling expansion of the navigational area branches comprise selecting a particular number limit for the navigational area branches allowed to remain in an expanded state at any given time.

2. The system of claim 1, wherein the customizable selections for controlling expansion are based on related content determined by keyword comparison.

3. The system of claim 2, wherein the one or more particular selected navigational area branches that are prevented from collapsing remain expanded, and a previously expanded navigational area branch collapses upon exceeding the predetermined maximum number limit for the navigational area branches allowed to remain in the expanded state.

4. The system of claim 3, wherein the previously expanded navigational area branch that collapses upon exceeding the predetermined maximum number limit for the navigational area branches allowed to remain in the expanded state comprises an oldest expanded navigational branch based on a time tag comparison between already expanded navigational area branches.

5. The system of claim 3, wherein the previously expanded navigational area branch that collapses is an earliest expanded navigational area branch of all previously expanded navigational area branches.

6. The system of claim 3, wherein the previously expanded navigational area branch that collapses is a least related navigational area branch to a most recently expanded navigational area branch of all previously expanded navigational area branches.

7. The system of claim 6, wherein the customizable selections for controlling expansion of navigational area branches further comprises a selection for preventing scrolling out of a display area for at least one expanded navigational area branch.

8. The system of claim 1, wherein the other navigational area branches that are collapsed upon exceeding the predetermined maximum number limit of the navigational area branches allowed to remain in an expanded state are not selected particular navigational area branches.

9. A method comprising:
   displaying navigational area branches on a device;
   controlling expansion of the navigational area branches;
   accepting selection for one or more particular navigational area branches; and
   preventing the selected particular navigational area branches from collapsing upon exceeding a predetermined maximum number limit, by collapsing other navigational area branches to maintain the predetermined maximum number limit, wherein the predetermined maximum number limit representing a selectable number limit of the navigational area branches allowed to remain in an expanded state, wherein the one or more particular selected navigational area branches prevented from collapsing is a leaf-node of a previously expanded navigational area branch that collapses upon exceeding the predetermined maximum limit for the number of the navigational area branches allowed to remain in the expanded state, and, wherein controlling expansion of the navigational area branches comprises selecting a particular number limit for the navigational area branches allowed to remain in an expanded state at any given time.

10. The method of claim 9, wherein controlling expansion of the navigational branches is based on a comparison of keywords for determining related content.

11. The method of claim 10, wherein the other navigational area branches that are collapsed upon exceeding the predetermined maximum number limit of the navigational area branches allowed to remain in the expanded state are not selected particular navigational area branches.

12. The method of claim 11, wherein the one or more particular selected navigational area branches to prevent from collapsing remains expanded and a previously expanded navigational area branch collapses upon exceeding the predetermined maximum number limit for the navigational area branches allowed to remain in the expanded state.

13. The method of claim 12, wherein the previously expanded navigational area branch that collapses upon exceeding the predetermined maximum number limit for the number of the navigational area branches allowed to remain in the expanded state comprises an oldest expanded navigational branch based on a time tag comparison between already expanded navigational area branches.

14. The method of claim 12, wherein the previously expanded navigational area branch that collapses is an earliest expanded navigational area branch of all previously expanded navigational area branches.

15. The method of claim 12, wherein the previously expanded navigational area branch that collapses is a least related navigational area branch to a most recently expanded navigational area branch of all previously expanded navigational area branches.

16. A computer program product for customizing navigational area branch control comprising:
   a storage device having computer readable program code embodied therewith, the computer readable program code comprising:
      computer readable program code configured to display navigational area branches on a device;
      control expansion of the navigational area branches;
      receive selection for one or more particular navigational area branches; and
      prevent the selected particular navigational area branches from collapsing upon exceeding a predetermined maximum number limit by collapsing other navigational area branches to maintain the predetermined maximum number limit, wherein the predetermined maximum number limit representing a selectable number limit of the navigational area branches allowed to remain in an expanded state, wherein a particular selected navigational area branch prevented from collapsing that remains expanded is a leaf-node of a previously expanded navigational area branch that collapses upon exceeding the predetermined maximum number limit for the navigational area branches allowed to remain in the expanded state, and
      control of expansion of the navigational area branches comprises selecting a particular number limit for the navigational area branches allowed to remain in an expanded state at any given time.

17. The computer program product of claim 16, wherein the other navigational area branches that are collapsed upon exceeding the predetermined maximum number limit of the navigational area branches allowed to remain in the expanded state are not selected particular navigational area branches.

18. The computer program product of claim 17, wherein the one or more particular selected navigational area branches prevented from collapsing remain expanded and a previously expanded navigational area branch collapses upon exceeding the predetermined maximum number limit for the navigational area branches allowed to remain in the expanded state.

19. The computer program product of claim 17, wherein the previously expanded navigational area branch that collapses upon exceeding the predetermined maximum number limit for the navigational area branches allowed to remain in the expanded state comprises an oldest expanded navigational branch based on a time tag comparison between already expanded navigational area branches.

20. The computer program product of claim 17, wherein the previously expanded navigational area branch that collapses is one of: an earliest expanded navigational area branch of all previously expanded navigational area branches, and a least related navigational area branch to a most recently expanded navigational area branch of all previously expanded navigational area branches.

* * * * *